INVENTOR.
VALENTINE HECHLER IV
BY,
ATT'Y

INVENTOR.
VALENTINE HECHLER IV.
BY
Harbaugh and Thomas
ATT'Y.

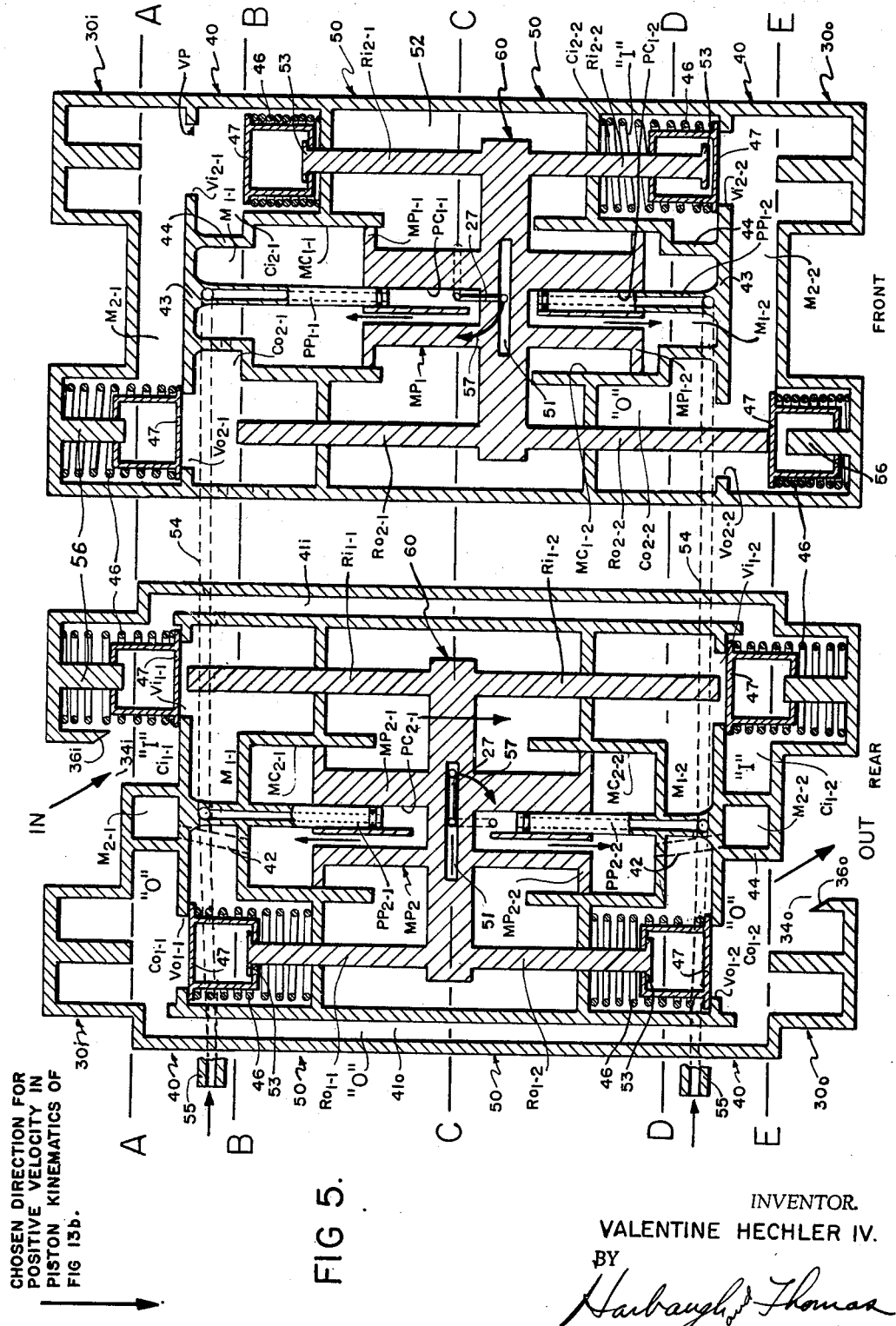

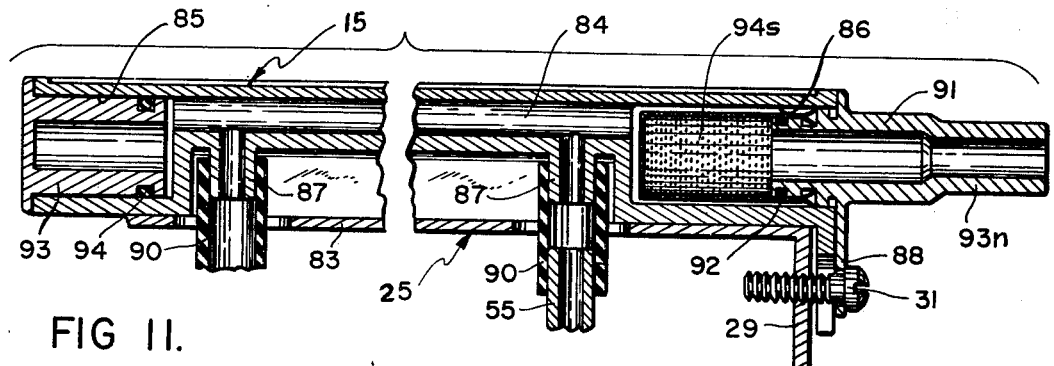
FIG 11.
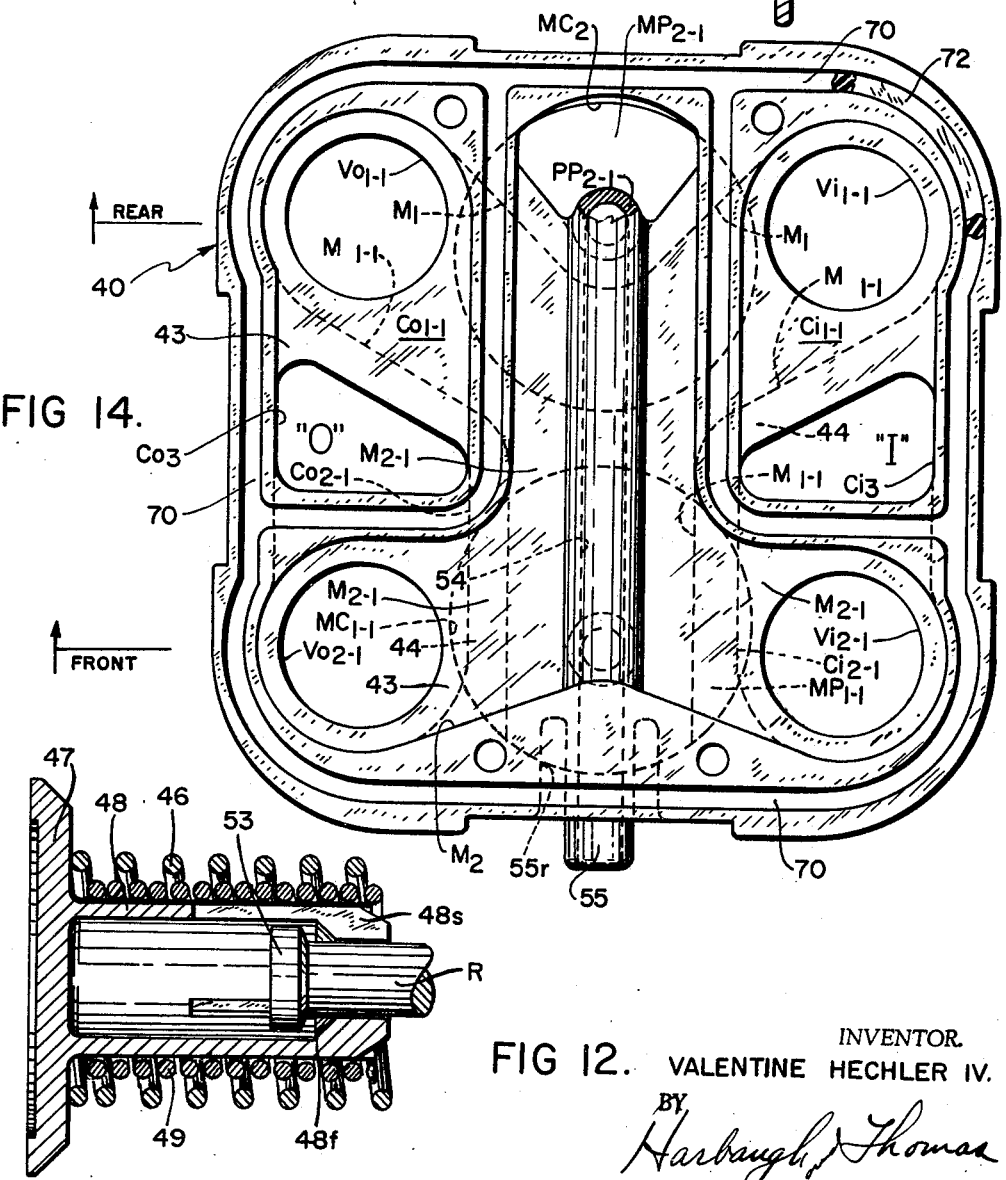
FIG 14.
FIG 12.
INVENTOR.
VALENTINE HECHLER IV.
BY
Harbaugh & Thomas
ATTY March 3, 1970   V. HECHLER IV   3,498,310
FLUID PROPORTIONING DEVICE
Filed Jan. 14, 1966   7 Sheets-Sheet 6

Relative Kinematic Relationships Of Pistons $P_1$ & $P_2$:
For Rotational Velocity Of Crankshafts

FIG 13a.

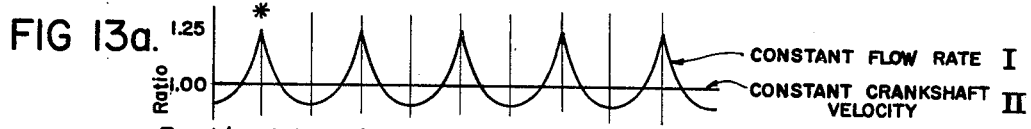

For Lineal Velocity Of Pistons:

FIG 13b.

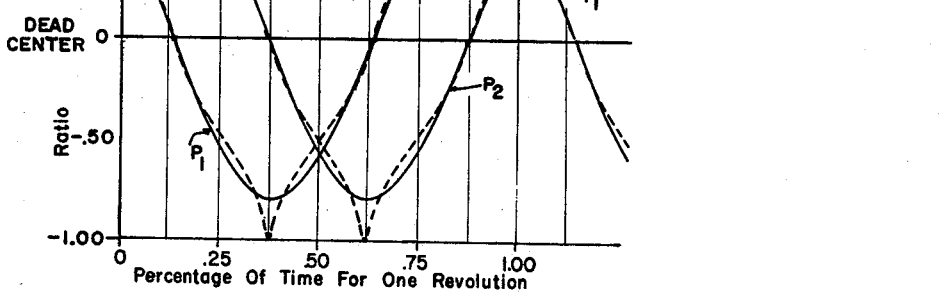

Total Output Effect Of Quadruple Piston Action:
For Constant Flow Rate

FIG 13c.

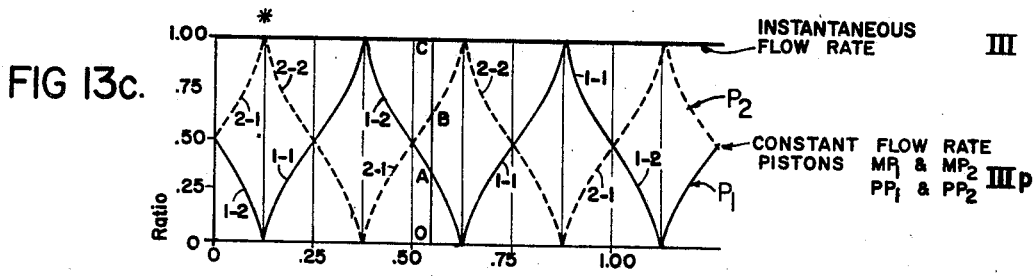

For Constant Rotational Velocity Of Crankshaft:

FIG 13d.

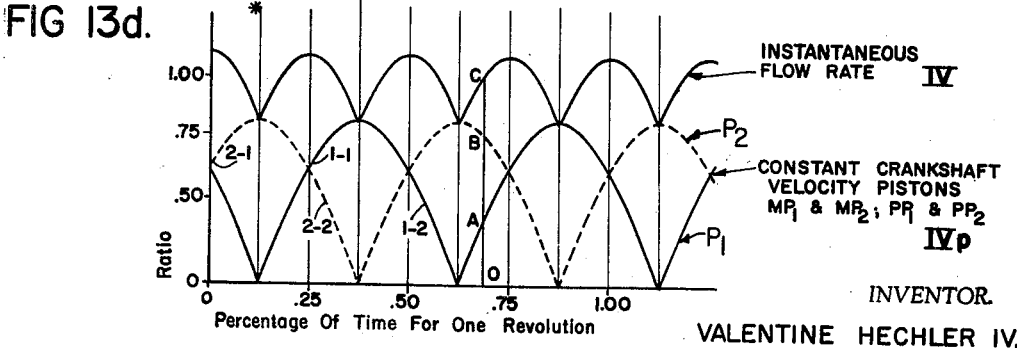

\* START AT CRANK ANGLES SHOWN IN FIG 5.

INVENTOR.
VALENTINE HECHLER IV.
BY
Harbaugh & Thomas
ATT'Y

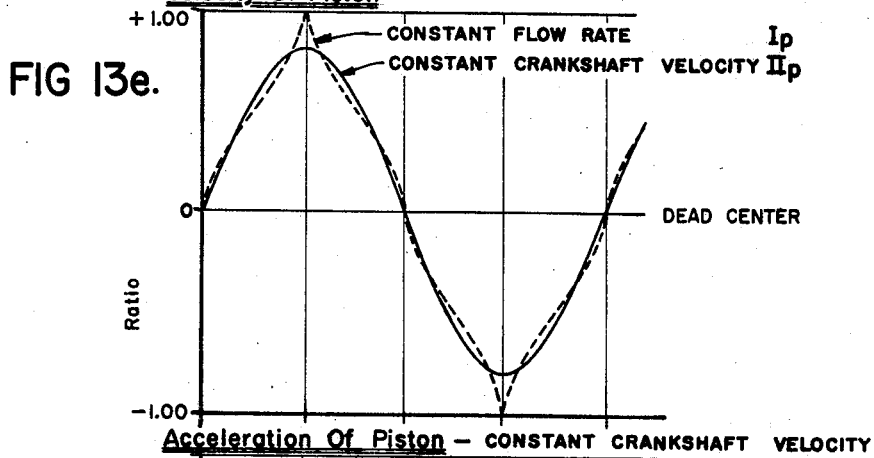
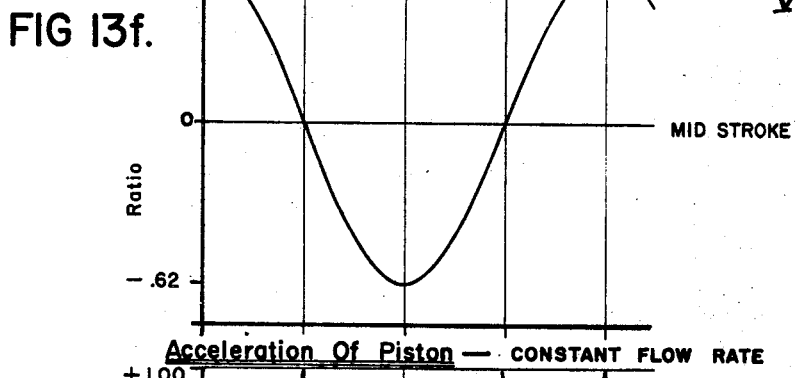
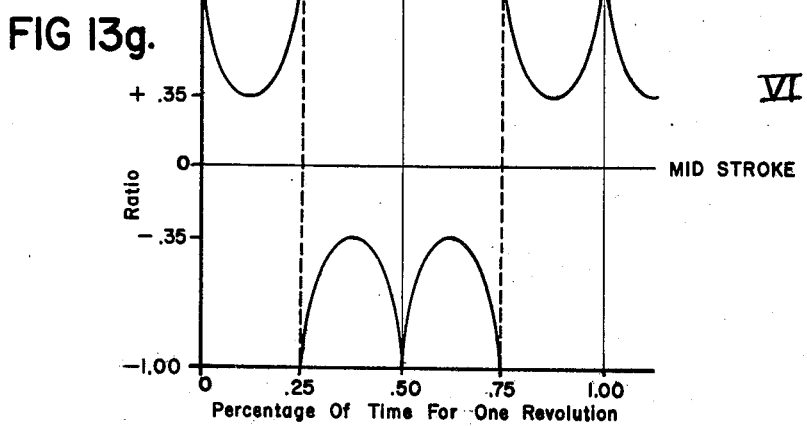

3,498,310
FLUID PROPORTIONING DEVICE
Valentine Hechler IV, 26 Meadow View,
Northfield, Ill. 60093
Filed Jan. 14, 1966, Ser. No. 520,568
Int. Cl. G05d 11/02; F16k 45/00; F04f 7/02
U.S. Cl. 137—99
22 Claims

ABSTRACT OF THE DISCLOSURE

A fluid proportioning device in which each of a pair of fluid motor pistons positively controls the valve action of the other while coordinated to reciprocate 90° out of phase with each other for each to operate pump means discharging a fluid into the fluid discharged from the cylinders of the respective pistons for a device in which a liquid motor of driven pistons actuates self-priming pump pistons directly with a nonconstant crankshaft velocity and acceleration to provide a nonpulsating constant flow rate output in which the exhaust of all pistons mix in exact and controlled ratios within the device. The driven pistons are arranged in pairs with each pair actuating the valves that control the action of the other pair and the pairs are linked to assure operation in stepped relationship.

---

The present invention relates in general to providing means for the continuous proportioning, mixing and dispensing of two or more fluids or liquids in exact and controlled ratios with a nonpulsating flow at any flow rate and with a low loss of pressure throughout a full range of flow rates as protected by a fail-safe back flow cutoff.

BACKGROUND OF INVENTION

Field of invention

Although the invention will be described as a horticultural aid to homeowners unskilled in handling chemicals by wet application for lawn and garden care in the fertilizing and control of weeds, fungus, etc., it is not to be limited thereto since it has many readily recognized applications in agriculture, parks and industry.

DESCRIPTION OF PRIOR ART

Fertilizers as generally contemplated by the public for lawn or garden care constitute a premixed, dry bulk, granular material in which the active chemicals are a rather minute percentage of the total. The applied materials provide a shallow feeding of roots whose benefits must be leached out by repeated applications of water either by sprinkling or rain, and the ultimate benefits are precarious and depend on additional acts of either man or nature. As a result, the bulk mixing, packaging, handling and shipping expenses comprise a major portion of the ultimate purchase price. Moreover, the user has to store and handle heavy packages and must employ expensive spreading equipment which requires considerable exertion in its operation and which can only work in two dimensions at the ground level to spread the fertilizer in paths that should not overlap. Difficulties and skips are incurred at boundaries and obstructions, and very often unavoidable and inadvertent overlapping of paths cause uneven lawn growth or even initial burning at the overlap. Centrifugal spreaders for dry material cause concentrations along the edges of the paths and undesirable dust. Furthermore, an application of water for wetting down is generally mandatory to avoid chemical burning of foliage. Also, persons with tender skins and allergies or medical reactions have to take extra precautions or abstain.

Some efforts have been made to provide liquid spray methods for benefit of deeper feeding of roots and ease of application. The problem and demand has been longstanding. Devices devised for this purpose have been wholly inadequate to accomplish the task. Chemical aspirators generally provided, for instance, utilize venturi principles which widely vary the chemical ratio with varying flow rates, and reduce the flow and spray power of municipally supplied water pressures so much that hoped for results are illusionary. Pressure tank sprayers require elaborate and pressure safeguarded systems of substantial expense, weight and cumbersomeness along with a pressure pump or air compressing facilities to operate them. Aerosol containers are "spoters" definitely limited in usefulness for lawn care.

SUMMARY OF INVENTION

The process and devices embodying the invention obviate the foregoing objections and difficulties. It provides a proper solution of exact ratio of any chemical concentrate for spray applications in three dimensions irrespective of flow rates, and utilizes municipal water pressures as a source of power. Not only can it handle fertilizer for lawn application in less than 25% of the time required for dry application, but it handles suspensions equally well and can be used for applying a wide range of chemicals on flowers, bushes and trees. There can be no "burning" of foliage, and boundary isolations of weed-killer applications are easily maintained against contact with trees and bushes.

The chemicals can be handled, mixed and stored without manual contact therewith in concentrate form and the exact solution ratio can be maintained over the complete range of flow rates with minimal pressure drop at full flow. Furthermore, devices embodying the invention for garden hose use can be located at either the faucet or nozzle end of a garden hose, and if at the nozzle end, the device along with the nozzle and chemical supply can be carried and manipulated for long periods of time with comparatively little fatigue. Furthermore, the device can be used with any nozzle desired, with little if any sacrifice of water pressure required to operate the nozzle as a water pressure nozzle. Such includes fogging mists, light sprays both narrow and board, coarse heavy sprays and ground penetrating nozzles for deepest root feeding.

The invention is characterized by a positive proportional flow and mixing operation in accurate ratio when the flow of diluent is in the intended direction of flow, but if inadvertently connected improperly the pump valves serve as a double safety check valve arrangement that seals off the concentrate against back-flow under pressure or vacuum conditions and the motor valves provide a free and open flow of diluent from the outlet to the inlet without actuation of the motor, whereby no damage to the apparatus nor injury to plants or people will occur. Preferably however, in the preferred embodiment illustrated, any possibility of back-flow of diluent or of mixtures that are ready for application is checked by an automatic back-flow check valve or vacuum breaker at the input end of the device. This is expressly done for health reasons as required by many municipal water systems even though the residuum of the undischarged mixture in the apparatus is intentionally slight at any given time.

One of the objects of the invention is to provide a continuously acting chemical concentrate diluting process which maintains a high degree of proportional accuracy over a wide range of flow rates with complete safety to users and protects against loss or contamination of the diluent during idle or shut down periods.

A further object of the invention is to provide positively synchronized displacement of diluent and concentrate simultaneously in a continuous, pulse-free flow, at any flow rate that is within the capacity of the diluent source to supply.

Another object of the invention is to provide a novel fluid motor that is fully responsive to the quantity of fluid passing therethrough which drives a pump, and at any rate of flow mixes a liquid chemical concentrate in accurate proportions under a high degree of turbulence with the fluid that operates the motor, without seepage or leaking during non-flow, and with little loss of flow pressures across the motor during operation.

Another object of the invention is to finalize the proportional mixing of concentrate and diluent with thoroughness as the diluent leaves the motor and before the mixture leaves the motor housing whereby immediate use or application can be made thereof as a final product if desired because of time or space.

A further object of the invention is to provide a mixing apparatus and process in which the ratio of one fluid to another is maintained essentially constant and independent of such parameters of operation as rate of fluid flow, relative pressures upon the fluids, pressure drops before and after mixing, and regardless of the location of the device controlling the flow or the rate of flow, ahead of, at, or beyond the point of mixing.

Another object of the invention is to provide motor and pump parts which have a low coefficient of friction, employ inexpensive but efficient seals and valves for the working pump parts and to lubricate the flow and the parts with a polyalkyene oxide such as polyethylene oxide in the concentrate to minimize the pump working load upon the motor.

A further object of the invention is to provide a limited contact area for the concentrate in the pump which can be flushed clean in seconds for or by another chemical concentrate entering the pump, and which when started automatically primes itself and prevents any vapor lock that might otherwise develop in the system.

The invention also contemplates the supply of vapor-free concentrates at atmospheric pressure from vapor-free storage containers which can be disposed in any gravitational orientation or location desired.

These being among the objects of the the invention, other and further objects will become apparent from the description and claims including duplication or identicalness of components and structure for inventory economy with the members made preferably of plastic for ease of assembly, testing, installation, operation and servicing.

Figure 4:
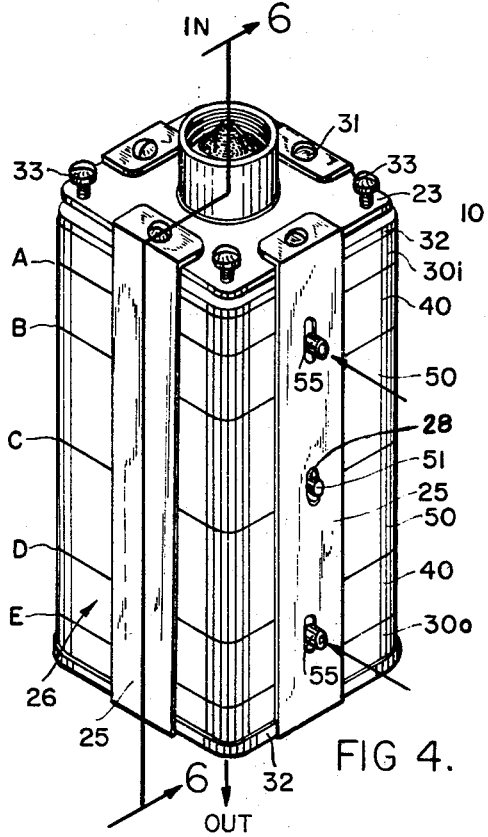
FIG. 4 is a perspective enlarged view of the motor-pump device embodying the invention for mixing concentrate in diluent.
Figure 7:
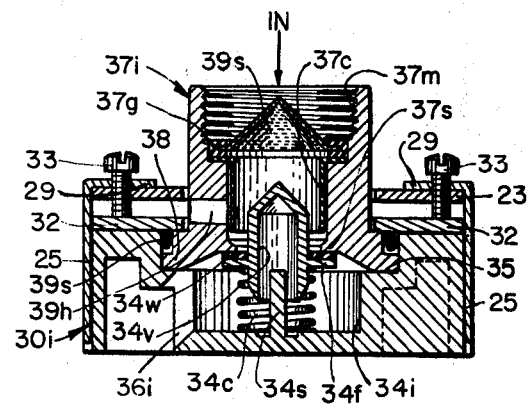
Figure 8:
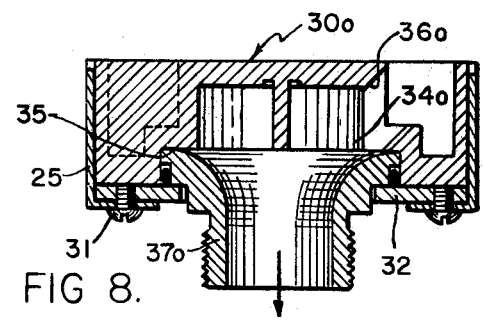
Figure 6:
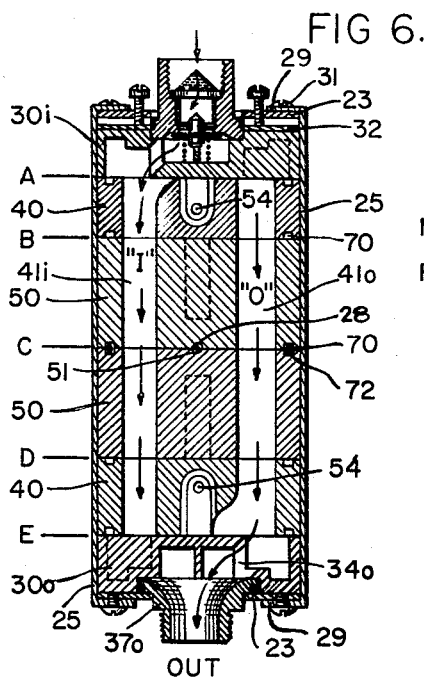
Figure 9:
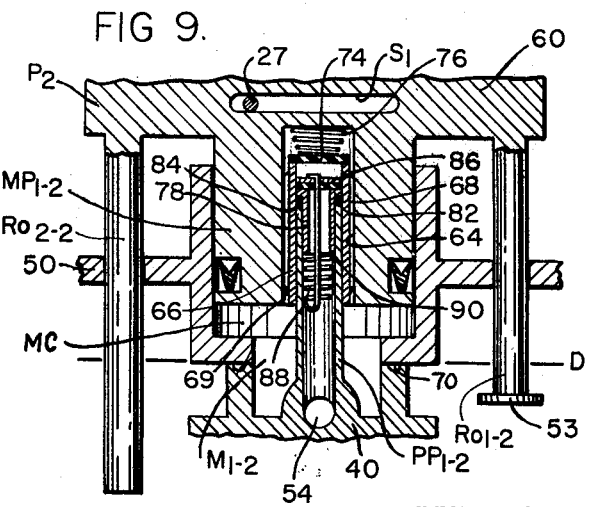
Figures 10, 10A:
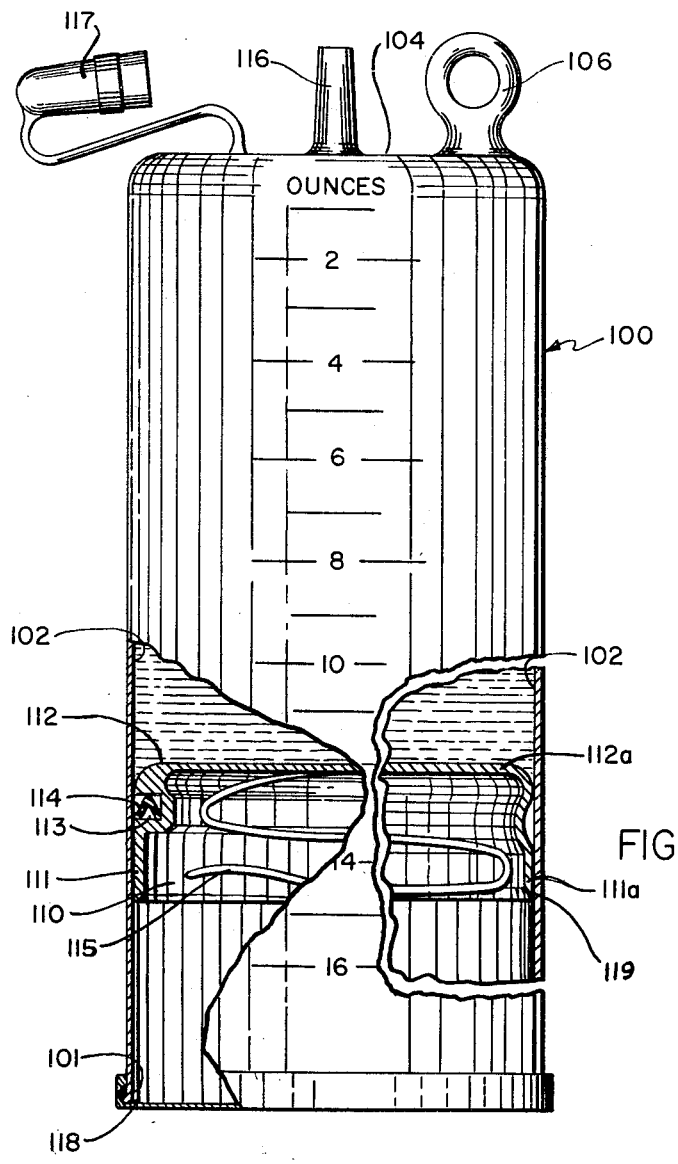

FIG. 5 is a diagrammatical representation of the relationship of the elements making up the device shown in FIG. 4 and the passages provided therein laid out in a single plane in which the right hand portion is a section taken on the plane of the piston axes in the right front half of the device as viewed in FIG. 4 and the left hand portion FIG. 5 is the same in the plane of the piston axes in the left rear half of same as indicated by line legends in FIG. 14;

FIG. 6 is a transverse section taken on line 6—6 of FIG. 4;

FIGS. 7 and 8 are enlarged views of the upper and lower head blocks respectively shown in FIG. 6;

FIG. 9 is an enlarged end half of a piston, pump and valve control unit portion of the embodiment shown in the other figures;

FIG. 10 is a side elevation partly in section of a concentrate container embodied in the invention;

FIG. 10a is a modification shown oriented in conjunction with FIG. 10 for purposes of clearer understanding;

FIG. 11 is a longitudinal section through a concentrate manifold attachment for the embodiment shown in FIGS. 4 and 5;

FIG. 12 is an enlarged axial section through one of the diluent flow control motor valves, all being alike;

FIGS. 13a, b, c, d, e, f and g are graphs comparing kinematics and performance curves between the present invention and the conventional piston pump operations employing a fly wheel or constant speed motor drive in which the axes of abscissas relate to the percentage of time for one revolution or cycle of the pump pistons of the invention and of conventional piston pumps with regard to constant output flow rate and constant crankshaft velocity, respectively. The axes of ordinates relate to ratios as follows:

FIG. 13a is the ratio of instantaneous velocities to average velocity;

FIG. 13b and 13e are ratios of instantaneous lineal velocities to maximum piston velocity, in the case of constant flow rate, when average flow rate of both pumps are equal;

FIGS. 13c and 13d are ratios of the instantaneous flow rates of individual pistons and their total to their total average flow rate;

FIGS. 13f and 13g are the ratios of the instantaneous lineal piston acceleration to the maximum piston piston acceleration, in the case of constant flow, when the average flow rate of both are equal;

FIG. 14 is a top plane view of the upper valve block shown in FIGS. 4 and 5.

For a better understanding of the description it may be well to characterize fluids and the working parts of the apparatus in relation to their functions. A diluent is generally water while the concentrate is any chemical of predetermined concentration that is to be diluted in exact proportions for dispensing. The diluent flowing under pressure actuates a motor having flow responsive motor pistons which in turn operate pumps having pump pistons to aspirate and inject exact portions of the concentrate into the diluent that is passing through the motor in a forward flow direction. The output is a mixture of exact proportions of concentrate and diluent under pressure. Backflow relates to an undesired flow in the opposite direction. The diluent pressure is the gauge pressure at the inlet of the device and the mixture pressure is the gauge pressure as measured at the outlet of the device under exactly the same flow discharge restrictive conditions. Pressure drop in the line relates to pressure drop in a conduit such as a garden hose which would occur with or without the embodiment in it. The capital letters identify like elements while like suffix numerals identify functional grouping of elements throughout the views so that the cooperation of the elements, assemblies and components can be better understood in the description of the drawings.

In this connection, it may be particularly noted that the letter "I" and suffix "i" is used to denote function concerned with "inlet" or incoming diluent, while the letter "O" and suffix "o" denotes function concerned with "output" or outgoing diluent. Furthermore, the system of all compartments and passages identified with the letter "I" in FIG. 5 are in continuous open connection with one another through passages $36i$ and $41i$ and the blocks 30, 40 and 50, and the system of all compartments and passages identified with the letter "O" are in open communication with one another through passages $36o$ and $41o$.

With these terms in mind the invention is characterized in its preferred apparatus embodiment by four motor pistons MP each having a pump cylinder PC in its head cooperating with stationary pump pistons PP extending inwardly from the motor cylinder heads whereby motor input of diluent and pump intake of concentrate occur simultaneously, and the output of the diluent and exhaust of the concentrate occur simultaneously for progressive mixing in the motor cylinder MC directly on each exhaust stroke. The four pistons are utilized in two pairs referred to generally as $P_1$ and $P_2$ and as $MP_1$ and $MP_2$ when their function as motor pistons is under consideration. Each pair act alternatively in opposite directions with the valving for each pair of motor cylinders $MC_1$ and $MC_2$ controlled by the movement of the other pair of pistons having the same suffix. Oppositely moving motor input valves $Vi$ and motor output valves $Vo$ for their respective motor pistons are self closing to direct the flow of diluent to and from the respective motor cylinders but open with the backflow of diluent through them to avoid reverse actuation of the motor pistons. Each pump is provided with tandem self-closing output and intake pump valves 74 and 86, respectively, (FIG. 9) that close against the backflow of concentrate therethrough to prevent flow of diluent into the concentrate intake passageway.

Moreover, for ease of assembly and inventory, the inlet valves $Vi$ for each pair of motor pistons MP are identical with the outlet valves $Vo$ of the other pair of motor pistons MP. Preferably the head of each motor piston MP is approximately four times the area of a valve port VP and of the diluent inlet or outlet openings "IN" and "OUT" (FIGS. 5, 7 and 8) in the motor housing for handling one-fourth of the mixture output each cycle in overlapping relationship with other pistons so that the flowing volume of diluent within the housing and in the flow channels is constant without pulsations at all times for any rate of flow. A yoke having two cranks interconnects the two pairs of motor pistons to assist the hydraulics of the system in maintaining their reciprocation in 90° phased relationship but without a constant rotational velocity of the cranks, the crank element being strong, but of light weight for this purpose to avoid any flywheel action.

Preferably, an external manifold with a single connection is provided for the concentrate. However if desired, the manifold can be removed and a separate concentrate opening is provided for the internal manifolds of those pairs of pumps that are laterally adjacent to each other so that two different ratios of mixtures can be dispensed merely by connecting the concentrate supply to only one or to both of the two pump inlets, or, two different concentrates can be connected to the different inlets, and if desired be separately valved for selective or composite use at the will of the operator.

Figure 1:
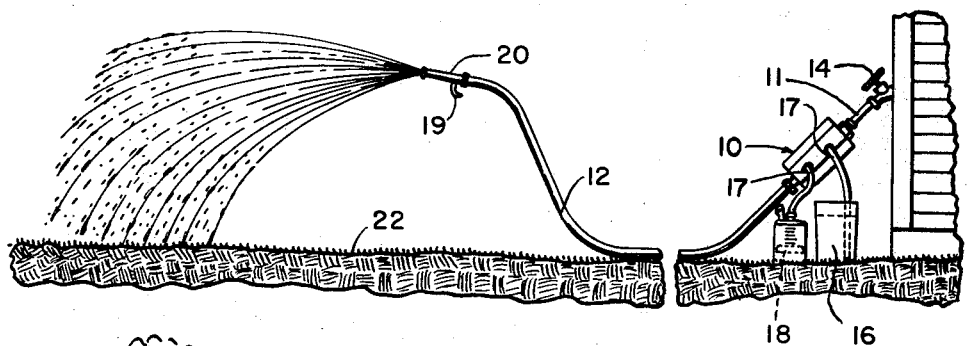
FIG. 1 is a diagrammatical picture view of the device embodying the invention used for lawn care.
Figure 2:
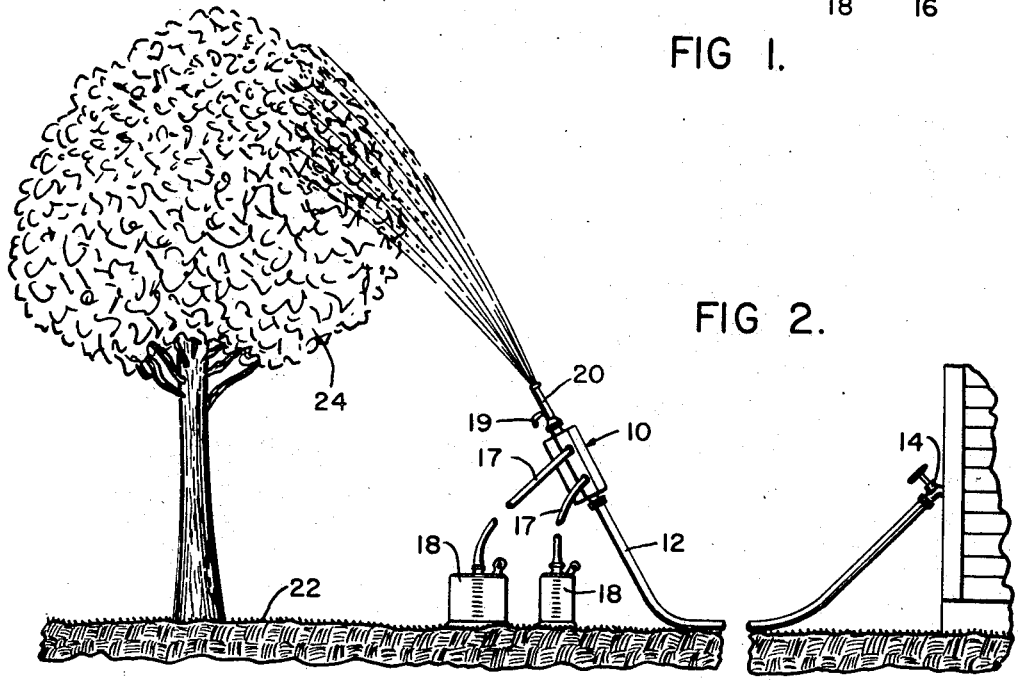
FIG. 2 is a view similar to FIG. 1 showing the embodiment in use for tree and bush care with the concentrate portable with the spray nozzle.

Referring now to the drawings in further detail an application of the inventive concept is demonstrated at 10 in FIGS. 1 and 2 as used at either end of a garden hose 12 and is supplied with municipal water from a valved water tap 14 preferably through a short section of hose 11. Concentrate is drawn from an open container 16 (FIGS. 1 and 3) or a closed container 18 (FIG. 10). A nozzle with a quick shut-off valve 19 is shown at 20 to spray the mixture on lawn 22 or on a tree 24. The concentrate in container 16 can be a fertilizer with or without growth or selective plant control additives while the concentrate content of the container 18 may be for pest control. In place of the nozzle 20 shown in FIG. 1 an earth penetrating one may be used as shown at 21 for tree root feeding in FIG. 3.

Figure 3:
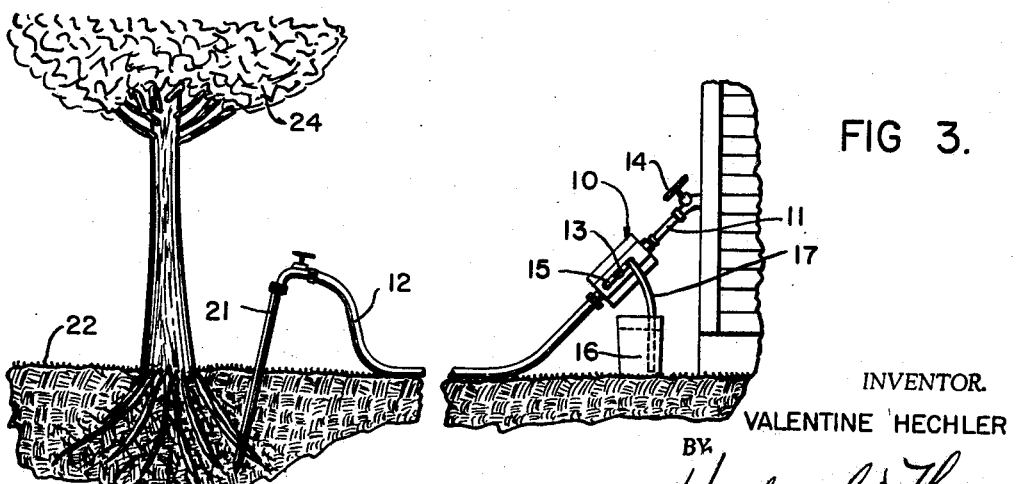
FIG. 3 is a view similar to FIG. 1 having the embodiment in use for deep tree root feeding.

In FIG. 1 two supplies of concentrate from containers 16 and 18 are shown as separately connected to the device by hoses 17. This is also true in FIG. 2 where safety containers 18 are moved around with movement of the nozzle 20. In FIG. 3 one container 16 is employed as connected through the external manifold 15 to the two concentrate inlets. The manifold may have a valve 13 to change the dilution ratio when desired as more particularly shown and described later in connection with FIG. 11. The short length of hose 11 is preferably employed between the device and the house to yield to lateral hose strains and eliminate any sound conduction to the house pipe system.

The device 10 preferably is constructed for in-line connection with the hose 12 and includes as shown in FIGS. 4 and 6, an external construction generally square cross-sectionally to provide a packaging and handling symmetry which also reduces the inventory of different components which are required to build the device. There are six housing members, two identical head or end blocks 30, two identical valve transfer blocks 40 and two identical cylinder blocks 50 all molded of chemically impervious plastic, such as polypropylene, can make up the blocks but preferably the cylinder blocks 50 are made of molybdenum polysulphide which I have found as an extremely low coefficient of friction with elastomers. There are two identical combination motor piston and pump cylinder units 60 as shown in FIGS. 5 and 9 that are coordinated for operation in stepped relationship by means of a 90° Scotch yoke crank element 27 (FIG. 5) journalled between the cylinder blocks 50 for operation in cross slots 28 provided in the piston units 60 (FIG. 6) with a varying rotation speed induced by the dynamic constant flow of water through the motor as reacted to and controlled by the reciprocating motor pistons in the motor cylinders. This is further described later in connection with FIG. 12.

As shown in FIGS. 4, 6 and 7, the housing units are externally clamped together between metal end plates 23 as contracted by longitudinal straps 25. O-ring type gasket grooves 70 are provided which with the gaskets 72 at the junctions, A, B, C, D and E make up the various compartments, chambers and passages formed in the housing which will be described later in full detail with the pistons in place. The straps have cusps 29 at opposite ends which overlie the remote faces of the end plates where they are secured thereto by suitable means such as screws 31. A vise member 32 is interposed between the top head block 30 and the upper end plate 23 and the spacing of the end plates is such as to receive the initially assembled block and gasket member therebetween, whereupon the blocks and gaskets are squeezed and held clamped as a sealed unitary device by clamp screws 33 that are threaded through the upper end plate 23 to terminally engage the vise member and displace it downwardly.

As constructed and oriented with the valve arrangement to be described, the upper head 30 serves as an inlet head $30i$ and the lower head serves as an outlet head $30o$ (FIGS. 7 and 8). Both heads are identical in that each has a circular recess in its outer face offset inwardly to provide a shoulder 35 with the inner portion of the recesses connected to the other sides of the blocks by open passages $36i$ and $36o$.

The inlet head $30i$ however is equipped with a swivel female coupling $37i$ having an external flange 38 at the inner end which is held loosely on a shoulder 35 in the wall of the recess $34i$ as sealed by a V-ring gasket $39s$ so that it can be swivelled and tightened at its internally threaded mouth $37m$ into sealing relationship with a male garden hose connector member or top 14, as sealed by gasket $37g$. A filter screen $39s$ is marginally carried by the gasket 39. At the bottom of the recess $34i$, an upstanding stud $34s$ is provided upon which is slidably mounted a back flow valve member 34v receiving the stud in a cavity 34v urged to its closed position by the light compression spring 34c and having a valve flange 34f thereon with a valve washer 34w engaging a valve seat shoulder 37s on the bushing. Vent holes 39h are provided through the wall of the bushing 37i ahead of the valve seat shoulder 37s and a cylindrical portion 37c on the gasket 37g extends inwardly over these holes to close them under internally applied water pressure and to flex marginally inwardly to provide a vacuum breaker valve when there is a danger that water will be drawn back into the house line from the device 10.

The outlet end 30o is similarly provided with a male hose bushing connector 37o but this one is clamped and keyed against rotation. These connectors serve also to indicate proper conventional orientation of the water connections for correct direction of flow of water. Suitable wording can also be provided on the hose connecting bushings to indicate direction of flow.

It is to be noted that the two heads 30 are identical and, with the respective valve blocks 40 assembled thereto, they provide compartments 34i and 34o at the top and bottom, respectively (FIGS. 7 and 8). These compartments communicate with compartments $Co_1$ and $Ci_1$, respectively, it being further noted that passages 41o interconnect the two Co compartments namely $Co_{1-1}$ and $Co_{1-2}$ while passage 41i interconnects the two Ci compartments, namely $Ci_{1-1}$ and $Ci_{1-2}$. The passages 41i and 41o are shown diagrammatically outside of the housing 26, in FIG. 5, but they are actually interior thereof as shown in FIG. 6 where the sectional view thereof is out of the planes of the diagrammatic representations of the composition of components shown in FIG. 5.

With respect to compartments $Co_{1-1}$ and $Co_{2-1}$, they are in open communication with each other by way of an opening $Co_3$ through wall 43 as shown in FIG. 14 interconnecting them where they vertically overlap and this is true also of compartments $Co_{1-2}$ and $Co_{2-2}$ and also of compartments $Ci_{1-1}$ and $Ci_{2-1}$, and $Ci_{1-2}$ and $Ci_{2-2}$ with separate openings for each pair.

Each valve assembly block 40 has four valve ports through the common cross wall 43 with partitions 44 arranged on opposite sides of the wall so that with each block 40 a pair of ports $Vo_2$ and $Vi_2$ (right half of FIG. 5 and front half of FIG. 14) at opposite ends are in communication with each other through manifolds $M_2$ disposed on the outer sides of the walls 43 and in communication with the cylinders $MC_2$ in the rear part of the housing 26, (left half of FIG. 5 and rear half of FIG. 14) through passages shown in broken lines 42. These same ports $Vo_2$ and $Vi_2$ are separated from each other by partitions 44 on the inner sides of the walls 43 with each in open communication with one or the other of the systems "O" and "I" respectively, as indicated by suffix letters.

With respect to the arrangement of the ports and compartments of each pair in the rear part of the housing, as shown in the left-half of FIG. 5, the outer sides of the ports, $Vo_1$ and $Vi_2$ (compartments $Co_1$ and $Ci_1$) are isolated by a partition 44 and are in communication separately with systems "O" and "I," respectively. These ports however on their inner sides of cross walls 43 are in communication with each other through manifolds $M_1$, namely, $Vo_{1-1}$ and $Vi_{1-1}$ through $M_{1-1}$ and $Vo_{1-2}$ and $Vi_{1-2}$ through $M_{1-2}$. The two manifolds $M_{1-1}$ and $M_{1-2}$ in turn are in communicaiton with cylinders $MC_{1-1}$ and $MC_{1-2}$, respectively located in the front half of the housing 26 through passages as shown in dotted lines 45.

It will be appreciated that if the embodiment shown in FIGS. 4 and 6 were rotated 180° about the axis of the crank member 51 the view shown in FIG. 14 would be the top plan view of the other valve block 40 but with the legends "O" and "I" reversed and with the last numerals "1" and "2" in the legends reversed.

Referring now to the structure and operation of the valves for the above purpose the valves will be referred to by the same identification as the ports with which they are associated.

The valves are lost motion poppet valves of like construction and control the flow of diluent from the inlet to the outlet through the motor passages. Each comprise a valve head 47 (FIG. 12), a compression spring 46 urging closure of the valve and a reciprocating valve rod R movable with respect thereto for a major portion of its excursion while actuating the valve during a minor portion of its excursion under the control of a motor piston.

The stem 48 is externally cylindrical to receive a light sleeve 49 of metal made preferably of comparatively closely wound spring coils which can easily be held to close tolerances. The length of the sleeves is substantially greater than the distance of the valve throw. The stem terminally defines radially flexing fingers 48f which terminally have inwardly offset shoulders 48s which are held against flexing outwardly when the sleeve is in place. When the valve body is mounted to be pulled open as shown by valves $Vi_2$ and $Vo_1$, the pull rods $Ri_2$ and $Ro_1$ are provided with heads 53 which are received past the valve stem shoulders 48s, which flex outwardly for reception thereof when the sleeve is withdrawn. The assembled working relationship is maintained by returning the sleeve to the position shown in FIG. 12.

It will be noted that with the valve block 40 separating from the cylinder block 50 at line D, in the position shown with valve $Vi_{2-2}$ in FIG. 5, the valve can be moved outwardly a further distance, more than enough to release and apply the sleeve 49.

The same valve member can be used with spring and sleeve for a push open valve as shown by valves $Vi_1$ and $Vo_2$. A control stud 56 is provided in the back cap space of the valve of a diameter which slides freely through the fingers 48f in guided relationship with the sleeve 49 in place. In this instance push rods $Ro_2$ and $Ri_1$ engage the face of the valve head 47 to open it outwardly.

Referring now to the action of the valve rods R on each piston unit MP it will be observed that one group of valve rods operate to push valves open and the other stems operate to pull valves open. In the valve system provided one of the valves in each manifold is located on the manifold side of the port while the other valve for each manifold is located on the opposite side of the wall 43. The valves at opposite ends of the housing that are axially directly opposite each other open in opposite directions, it being noted that to accomplish this the valves in the identical valve blocks are arranged in one block on the opposite sides of the valves in the other block, whereby all valves close in the direction of flow of diluent through the housing so that the action of the pistons is assured, while all valves open with backflow in the unintended direction of flow to prevent flow through the device yet prevent application of power to the pistons yet such flow is prevented under the action of the backflow check valve 34v.

The push and pull rods are integrally formed with the motor piston units $MP_1$ and $MP_2$ (FIG. 5) each piston unit comprising opposing pairs of pistons, pair $MP_{1-1}$ and $MP_{1-2}$ and pair $MP_{2-1}$ and $MP_{2-2}$. A helpful clew is to note that suffixes "1-1" and "1-2" indicate control by other elements respectfully bearing suffix identifications of "1-1," "1-2."

If both piston units MP were in dead center, none of the valves would be actuated. They would all be closed. However, in motor resting conditions as shown diagrammatically in FIG. 5, the Scotch yoke 27 interdrive precesses movement of piston $MP_1$ ahead of $MP_2$ with an arcuate advance of 90°. Therewith, when either piston unit is at its midpoint the other piston unit is at one limit of its excursion under a set of conditions in which the midpoint piston unit MP is being powered by diluent at one end and diluent is being exhausted at the other end through the valves controlled by the other piston unit.

More particularly, as related to the sequential operation of the valves with respect to the systems marked "I" and "O" it may be best, for purposes of orientation, to note again that the right portion of FIG. 5 is the front half and is superposed on the left portion which is the rear half in the finished product. Moreover, with pairs of port openings separated on one side of the common wall 43 and manifolded on the opposite side of the common wall 43 as cross connected front-to-rear and rear-to-front, it will be appreciated that the manifolds are shaped like a T with the passages 42 and 45 comprising legs disposed between and isolated from adjacent ports whereby all of the legs are coplanar in a plane common to the two axes of the piston units with the ends of the T legs opening into the respective cylinders as already described for passages 42 and 45.

Now assuming piston $MP_1$ has just been approaching its lower limit shown in FIG. 5, input diluent will have been supplied to cylinder $MC_{1-1}$ and manifold $M_{1-1}$ through the closing valve $Vi_{1-1}$ as controlled by the push rod $Ri_{1-1}$ being retracted by the piston $MP_2$ on its downward movement. This downward movement of piston $MP_2$ has been accomplished under pressure of input diluent in manifold $M_{2-1}$ being conducted thereto through valve $Vi_{2-1}$ that has been drawn to its open position by pull rod $Ri_{2-1}$ on piston $MP_1$.

Thereafter continued downward movement of piston $MP_2$ forces output diluent from cylinder $MC_{2-2}$ into manifold $M_{2-2}$ and to the output connection 36o through the valve $Vo_{2-2}$ that has been pushed to its open position by rod $Ro_{2-2}$ carried by the piston $MP_1$. Then when piston $MP_2$ approaches its lowest limit, valve $Vi_{1-2}$ will be opened by push rod $Ri_{1-2}$ on piston $MP_2$ and valve $Vo_{1-1}$ will be drawn to its open position by pull rod $Ro_{1-1}$. Opening of valve $Vi_{1-2}$ introduces input diluent to cylinder $MC_{1-2}$ while the opening of valve $Vo_{1-1}$ will connect cylinder $MC_{1-1}$ through manifold $M_{1-1}$ to the output system "O." Piston $MP_1$ is then forced upwardly until it reaches its half way position whereupon piston $MP_2$ has reached its upper limit where all valves are then closed except valves $Vi_{1-1}$ and $Vo_{1-2}$ which were opened by terminal upward movement of piston $MP_2$. These open valves are applying inlet pressure to cylinder $MC_{1-1}$ and exhausting cylinder $MC_{1-2}$ to outlet 36o, respectively. Thereupon $MP_1$ moves downwardly beyond its mid-point to the position first described to open valves $Vo_{2-2}$ and $Vi_{2-1}$ to carry piston $MP_2$ back to its midpoint for a repeat of the cycle described.

It is to be noted that pairs of valves progressively open and close as the controlled piston accelerates and decelerates in each direction whereby adequate flow for the accelerated piston action is provided through the ports with an action wherein their effective flow area on opening and closing is related to the intake requirement and exhaust efforts of the pistons so as not to provide restriction to a constant flow of diluent or mixture provided by the four pistons in which the sum of the outputs of two coacting pistons at any given instant of time equals unity. For instance, as a piston goes through each stroke its lineal displacement is not a sine wave motion of a flywheel driven piston, but rather is subjected to and accommodates the dynamics of a constant rate of liquid flow in which a piston starts slowly and then accelerates rapidly to its midpoint and then decelerates rapidly and slows to a stop at the end of its stroke. The respective valves controlling its movement open rapidly as the piston slowly travels a short preliminary distance and are practically open for approximately the piston mid-range fast movement and then close rapidly during the slowed terminal movement of the piston. In brief, the throw of the valves is a little faster than proportional to movement of the piston on each side of its mid-point. This is because the valves are controlled by the other piston precessing the controlled piston by 90°.

More particularly, with reference to FIG. 13, curves are shown in FIG. 13a to compare the piston kinematics of the invention as between constant output or flow rate (Curve I) as compared with constant velocity flywheel-driven pistons (Curve II) which results in a pulsing output or flow. The curves $Ip$ and $IIp$ in FIG. 13b show the relative velocity of the pistons as directly explained by the notations there appearing.

The same pistons $MP_1$ and $MP_2$, located 90° apart as shown in FIG. 5, are considered in both instances and their respective flow output rates are shown in Curves III and IV and $IIIp$ and $IVp$ in FIGS. 13c and 13d. Curve $IIIp$ shows the flow rate of each piston when operating under the constant flow conditions of the invention in accordance with Curve I while Curve $IVp$ shows the flow rate of each piston if they were to be operated under constant flywheel action in accordance with Curve II.

Since the output of the two pistons under the flywheel action would be equal only when the pistons are at 45° from dead center and moving in opposite directions, the curves are oriented in both instances to this as a starting point. The Curves $Ip$ and $IIIp$ with constant flow rate show rotational crank acceleration as each piston passes its dead center and at its mid stroke and deceleration as each approaches its 45° crank positions. This is a distinctive characteristic of the invention in which total output is constant (Curve III). Curves $IIp$ and IV show that with constant crankshaft velocity the output is pulsing and pulses with a sharp drop off of flow and startup of flow which for four pistons occurs four times each revolution. This pulsing causes hammering and undesirable fertilizer spreading characteristics unless surge tanks are used.

This constant flow rate (Curve III) is a desired factor built into the fuctioning of the device for uniform spray spread and since the displacement during the reversing movement of one piston stroke is overlapped by the increased acceleration of another piston both for exhaust and intake excursions, with the valves correspondingly correlated to provide same, the total flow of diluent both into and out of the motor cylinders MC is without pulsation thereby eliminating any hammering that occurs with the sudden opening and closing of valves by the pistons which is advantageous in the present invention.

In fact the valves, if started with a 90° displacement, will endeavor to preserve this angle by their own cooperation under a constant inlet flow rate. However, to assure this 90° relative displacement, the double crank member 27 is employed in a Scotch yoke arrangement with slots 51 and 52 in the pistons to preserve this 90° relationship during shut down periods and for properly synchronized coaction at all times. The flow size of the valve port openings in their coaction do not limit the speed of the device with respect to an openness to flow under pressure of diluent passing through the device. The crank is journalled in mating grooves between the piston blocks at the mating line C as shown in FIGS. 5 and 6 with the crank arms 27 displaced 90° for rotation in the direction indicated by arrows 57.

Furthermore, there is no differential displacement in the compartment space in the dead space between the piston heads of each unitized pair and thus this space can be a single compartment 52 either open or closed. If closed, it can be sealed with the lightest of seals since there is little pressure drop across the heads of each piston unit MP. In fact, pressure of the incoming diluent being a little higher the diluent in the crank space compartment 52 will remain clean even though different concentrations are used. In fact, the crankcase can be lubricated with a water soluble lubricant. However Polyox is preferred which cuts both mechanical and fluid friction.

Having thus described the motor characteristics of the valve and piston assemblies, reference is now made to FIGS. 5 and 9 which show the construction and arrangement of one of the four identical pumps carried by the cylinder blocks 40 to cooperate with the piston heads.

A hollow pump piston PP is carried by each cylinder head in both cylinder blocks and is in communication with a cross head manifold 54 which supplies the pump pistons with concentrate received through a nipple 55 (FIG. 4) from a source of supply 18 as already described. The pump pistons extend into the respective cylinders a distance sufficient to cooperate with the motor pistons MP throughout their movement and the motor pistons in turn are cored out with blind holes 64 to accommodate the pumping pistons.

The cored out holes 64 receive plastic pump cylinder sleeves 66 therein. Sleeves 66 are preferably fabricated of plastic containing a lubricant, such as the proprietary product Nylatron, sold by Polymer Corporation of Chicago, which is nylon impregnated with molybdenum disulfide ($MoS_2$). Other such products containing lubricants such as graphite and the molybdenum polysulfides e.g., $MoS_3$ and $MoS_4$, may be used. The outside diameter of the sleeves is greatly less than the holes 64 so that there is an exhaust passageway 68 clearance between them with longitudinal integral external ribs 69 supporting the cylinder sleeves 66 in spaced relationship to the wall of the holes 64. The cylinder sleeve is press fitted with respect to the bore to secure the sleeve in the piston bore 64 in cooperating concentricity with the sleeve piston PP against inadvertent movement.

A disc 74 is disposed at the inner end of the cylinder sleeve 66 to cooperate therewith in a dual capacity of a cylinder head and pump output check valve that normally closes against the inner end thereof under the influence of a light compression spring 76.

A flanged sleeve member 78 is press fitted into the end of the sleeve piston PP and is provided with an internal shoulder 82 at the inner end thereof to help support the pump intake check valve 86. A disc valve element 86 closes against the end of the sleeve member as an inlet valve as urged in that direction by an involuted compression spring 88 interengaging the disc and the internal shoulder 82 of the inner end of the sleeve member 78. A groove-like space is left between the end of the sleeve piston and the flange of the sleeve member for the reception of a V-ring 84 therein that cooperates as a pump seal with the inner wall of the plastic sleeve cylinder 66 which surprisingly reduces to less than a third the friction and wear of resilient piston seals against metal.

Concentrate is ingested into the cylinder sleeve 66 through the inlet valve 86 on the retracting movement of the pump piston PP for substantially the full movement thereof and then is forced out therefrom into the motor cylinder MC through the outlet valve 74 and exhaust passage 68 around the sleeve cylinder 66 as the motor piston MP advances to exhaust diluent ahead of it. Thus, concentrate is injected in exact proportions into the motor cylinder with each discharge of diluent by the motor pistons.

As each pump piston PP reaches the end of its movement the intake valve 86 engages and opens the outlet valve 74 enough to release any compressed air that may be trapped between them and thereby assures a quick and full prime, otherwise, there being a substantial back pressure of diluent against the outlet valve 74 a full evacuation of such air might be inhibited. This is significant since the concentrates are changed from time to time and full priming immediately is desirable with the first couple of strokes of the motor piston for quick and accurate proportioning with changed concentrates. Otherwise, air could expand and contract endlessly in the pump cylinder 66 without the outlet valve 74 opening under high diluent pressures. The assured discharge of entrapped gas each stroke is replaced by some concentrate intake and within two to four strokes an otherwise air bound pump is fully primed. Thereafter, the pump is capable of lifting concentrate a substantial distance by developing a partial vacuum or negative gauge pressure as low as 3 lbs. per square inch, absolute, without changing the resulting output volume of the concentrate each stroke.

It will be observed (FIG. 9) also by the planes B and D of separation indicated between the valve and cylinder blocks 40 and 50 that the concentrate piston PP protrudes beyond same for the ready visual assembly of the elements associated therewith as described, and further either one or both concentrate manifolds can be connected to sources of concentrates for progressive and simultaneous admixture thereof in the diluent directly in the motor cylinders during the strokes that exhaust the diluent and concentrate as already described. Whether the motor runs fast or slow, depending on the external valving of the mixture output, the proportioning and mixing factors are constant for any set of conditions or flow speeds.

Reference is made to FIG. 11 for further details of the concentrate manifold 15 as assembled to the housing to provide a single connection for concentrate. Same comprises an elongated body 83 having a longitudinal conduit 84 enlarged at opposite ends to provide a pressure relief opening 85 and an inlet opening 86 and two outlet nipples 87 directed towards the housing 26 and spaced a distance equal to that of the housing nipples 55 which have cylindrical reliefs 55r (FIG. 14) around them. Adjacent to the inlet opening 86, the body 83 is provided with a slotted ear 88 which is secured under the screw 31 holding the strap cusp 29 after hose couplings 90 are installed between the nipples 87 and 55. Thereafter the hose couplings and screw 31 hold the manifold in place at the points of greatest strain. A tube adapter 91 is plugged into the inlet opening as sealed by an O-ring 92 under frictional tension with a nozzle 93n receiving the concentrate supply hose 17. The pressure relief opening 85 frictionally receives a blow-out plug 93 therein sealed by an O-ring 94 so that in event of pressure developing in the concentrate line, the plug 93 can be dislodged thereby to relieve a temporary pressure surge or can abort to vent the manifold.

It will be observed that the tube adapter 91 has a screen 94s and since both along with plug 93 can be readily removed, the manifold can be quickly cleaned or flushed anytime, it being appreciated that the suction on the concentrate exerted by the pump pistons PP assists in holding the adaptor and plug in place as well as their frictional engagement.

Reference now is made to the details of the preferred concentrate supply (FIGS. 10 and 10a) which cooperates with the pump concentrate action to maintain a constant proportion and also provides mobility with complete safety provided by the pump action against concentrate being spilled and causing plant damage because it is not completely diluted before contact.

The preferred container embodiment comprises a bottle shaped member 100 having an open bottom end 101 but provided with a cylindrical inside wall surface 102. Preferably, a slight crown is provided in the top wall 104 and also an eyelet 106 which can be gripped if no handle is provided with comparatively small containers. A cup-shaped follower member 110 having a cylindrical external surface 111 slidably mating with the cylindrical surface 102 removably closes the open lower end 101 with both marginal edges reinforced by a head 112.

Adjacent to the head 112 of the closure member 110 the side wall has a circumferential groove 113 therein which receives a sliding seal gasket 114 such as a V-ring seal which faces outwardly to prevent air entering the container 100. Also, in the center of the movable closure, a handle or a tether 115 is provided by which the container can if desired be carried so that the weight of the contents activates the seal 114 and can also be used to separate the parts when replenishing is required.

In FIG. 10a, a modification of the head 112 is shown at 112a wherein the skirt 111a has a feather edge 119 seal maintained by it being slightly oversize and urged into engagement with the container wall surface 102 by atmospheric air pressure.

The outlet at the neck comprises a nipple 116 for receiving the hose 17 or cap 117 which can be located on the nipple portion when the container is not being used. A clamp (not shown) can be located on the hose 17 if sealing off the outlet nipple 116 is desired without disconnecting the hose, when storing or replenishing the container. A removable perforate guard cap 118 can be used to support the marginal edges of the open end against damage.

The manner of using the container is novel due to the high vacuum potential of the pump and the exposed area of the closure 112 or 112a. With the outlet 116 or hose 17 open, the closure 112 can be withdrawn with the top inclined downwardly to retain residue concentrate. The outlet opening 116 or hose 17 is then closed and the container supported with its bottom up and open. The container then receives the contents of a package of liquid or dry chemical concentrate and is then filled to a predetermined level with diluent to provide the working concentrate. The package includes a small percentage of less than 1% polyethylene oxide or similar material. The cap is then reinserted until the seal 114 engages the side wall 102 after which the container 100 is righted, the outlet 116 opened and the bottom closure 112 is pushed up until all air is exhausted from the container. Thereupon, the hose is activated and the container is ready for dispensing.

The bottle can be carried in any position with the cap on and when the pump is actuated to withdraw concentrate the bottom moves inwardly under atmospheric pressure. If the interconnecting hose becomes disconnected the concentrate will not leak out because there is no air in the container to expand regardless of what orientation the container is disposed in and friction of the head on the wall will prevent movement in normal handling. This is also true if the container is stored between uses with liquid-solid concentrate stored therein. Such liquid solid storage in a chemically impervious container prevents deterioration of contents that may otherwise be caused with air in contact therewith.

Shear friction characteristics of high velocity water flowing along conduit walls and in turbulent areas is greatly reduced by mixing a long-chain polymer additive such as by way of example, the polyethylene oxide already mentioned which is marketed as Polyox 301 by Union Carbide Chemical Co. and having a molecular weight of $5-10^6$. It is used in a finely divided powder mixed with a granular crystalline urea formaldehyde fertilizer such as sold commercially at Nitroform by Hercules Powder Co. which for long effect is essentially not soluble in water. Then when the dry mix is mixed with water and the polymer hydrates to form a concentrate, the viscolastic polymers establish themselves as having a long rope like configuration in flowing water, but in quiescent water they coil and retain the urea particles in a colloidal suspension against precipitation to provide a uniform concentrate that can stand for hours preliminary to dispensing for further dilution as described herein at the time of application of the urea to plant life.

In this connection with the polymer powder mixed with the urea formaldehyde particles, a dispersion is provided which hydrates instantly without agglomeration. The chained molecules generally characterized by a length 2 to 30 times their effective diameter and having a high tensile strength are disentangled with flow to provide a shear friction reduction and also operate to lubricate the sliding surfaces of the working elements in both the pump and the motor since the concentrate carrying them is discharged within the working cylinder where the polymer contacts the working surfaces with an accumulative lubricating effect and are spread by the reciprocations thereof. Any lubrication provided this way is of short duration, being ultimately washed away in minutes if not renewed by further contact with the new molecular chains. The molecular chains also provide molecular skin effects which do not tighten close tolerances between moving parts yet thoroughly lubricates them. Such lubrication reduces pressure drop across the motor by as much as 30% and if the hose 17 is connected to the outlet of the device the pressure drop through the hose is also reduced substantially due to the presence of the polymer.

It has been found that with the high turbulence accomplished by the embodiment described, there may be some scission of the chains which is permanent. However, with their millisecond use they have served their lubrication purposes with enough unharmed chains that pass on to still effectively reduce wall friction in a hose connected to the outlet. Polyox portrays the least degradation with excellent results as outlined over a relatively wide range from 500 to 1000 p.p.m. in the concentrate, further dilutions being within the range of 20 to 40 times. The polymer is ultimately discharged to ground or foliage and is dissipated as an inert and harmless substance which again coils and dries as friable elements in the soil.

Referring to FIG. 13g for a graphic representation of the piston acceleration in its operation for a constant flow rate as compared with a concentration pump piston shown in FIG. 13f, it is to be understood that deceleration is a negative acceleration in the arbitrary direction chosen for acceleration. Therefore, the magnitude of acceleration or deceleration can be referenced as scaler quantities by the use of the word absolute preceding the magnitude is that reference need only be made to acceleration. It will be observed that there are three acceleration peaks, each stroke direction, one upon leaving dead center at one end, one at the midpoint range, and one as it approaches its opposite dead center position, with two absolute magnitudes of accelerations alternately sandwiched between them of a lesser magnitude reading approximately 35% of the magnitude of said acceleration peak. Then with two pistons angularly spaced 90° the points of maximum absolute magnitude accelerations coincide, the composite displacement of the pistons is substantially constant throughout simultaneous half cycles of the two pistons as where one starts at its dead center and the other at its midpoint.

Having thus set forth the objects and described a preferred embodiment of the invention with its novel arrangement of parts and results attained, it will be seen how the stated objects are attained, particularly in the safe handling of horticultural chemicals by home owners, and how various modifications and changes can be made therein including interdriving the motor and pump elements without integration of motor and pump elements and also using the crankshaft as a primary power drive for associated purposes without departing from the spirit of the invention.

What is claimed is:

1. In a fluid proportioning device, a housing including head blocks at opposite ends thereof having outwardly opening recesses offset inwardly to provide a shoulder with the inner portion of the recesses connected to the other side of each block to serve as inlet and outlet passages respectively for the housing, the inlet block having a valve guide means in the recess, a check valve member slidably mounted on said guide means, a threaded female coupling member having a radial flange swively engaging said shoulder and a valve seat engaged by the check valve member, sealing means between said coupling member and the inlet block, retainer means retaining said coupling member in swivel engagement with said shoulder, a threaded male coupling member having a radial flange engaging the shoulder in the recess of the outlet block, said passages being disposed on diametrically opposite sides of the housing, valve blocks engaging the other sides of the head blocks and having passages therethrough connected to said head block passages, each valve block having a common crosswall having four valve ports therethrough, two of said ports being manifolded on the outer sides of each valve block and opening into the passage on one side of the housing and the other two ports being manifolded on the inner side of the valve blocks and opening into the other passage on the other side of the housing, a cylinder block means between said valve blocks having parallel cylinders axially disposed in a central plane disposed between opposite pairs of manifolded ports, each cylinder including passage means communicating with the manifolded ports located on the other side of said plane outwardly therefrom, and valve means for each port opening in a direction opposite to the direction of flow through the port from the inlet passage to the outlet passage, and piston means in the cylinders actuating said valve means and controlled thereby.

2. The combination called for in claim 1 in which said piston means comprises a motor piston in each cylinder with the pistons interconnected in pairs that are disposed in the axially aligned cylinders, means interconnecting the pairs of interconnected pistons in unitized relationship wherein one piston unit is halfway through its stroke when the other piston unit is at the end of its stroke, said valve means comprising an inlet valve means for conducting diluent fluid under pressure from the inlet passage to the manifold of each cylinder controlled by the piston unit operating in the other pair of cylinders during a reciprocation excursion of the latter piston unit in one direction from their midpoint back to the midpoint, and exhaust valve means for discharging the same manifold for each cylinder to the outlet passage as controlled by the latter piston unit during its reciprocation excursion in the opposite direction, from its midpoint back to its midpoint, and pump means actuated by each piston for drawing concentrate fluid from an inlet and discharging it into the cylinder of that piston.

3. The combination claimed in claim 2 in which said pump means includes a pump cylinder cavity in the body of the motor piston, a pump piston supported on the head of the motor cylinder coaxial with said pump cylinder cavity, and outlet means from the pump cylinder cavity through the body of the motor piston into the motor cylinder including a pump discharge check valve.

4. The combination in claim 3 including a concentrate manifold and said pump piston has an inlet passageway means therethrough connecting the manifold to said pump cylinder cavity including an inlet check valve means, and an outlet means from the pump cylinder cavity through the body of the motor to the motor cylinder including a pump discharge check valve.

5. A fluid proportioning device comprising a housing having two motor cylinders therein, a motor piston reciprocably mounted in each cylinder, means interconnecting said pistons for coordinating their movement wherein one piston is halfway through its stroke when the other piston is at the end of its stroke, an inlet valve means for diluent fluid under pressure for each cylinder controlled by the piston moving in the other cylinder during its reciprocation excursion in one direction from its midpoint back to midpoint, and exhaust valve means for exhausting each cylinder controlled by said piston in the other cylinder during its reciprocation excursion from said midpoint back to midpoint in the opposite direction; and pump means actuated by each piston for drawing concentrate fluid from a concentrate inlet and discharging the concentrate fluid into the diluent discharged from the cylinder of that piston.

6. The combination called for in claim 5 in which said pump means includes a pump cylinder cavity in the body of the motor piston and a pump piston supported on the head of the motor cylinder coaxial with said pump cylinder cavity, and outlet means from the pump cylinder cavity through the body of the motor piston to the motor cylinder and including a pump discharge check valve.

7. A fluid proportioning device comprising a housing having four motor cylinders therein opposing each other in two axially aligned pairs, a motor piston in each cylinder with the pistons interconnected in pairs that are disposed in the axially aligned cylinders, means interconnecting the pairs of interconnected pistons for coordinating their movement wherein one piston pair is halfway through its stroke when the other piston pair is at the end of its stroke, an inlet valve means for diluent fluid under pressure for each cylinder controlled by the piston pair operating in the other pair of cylinders during a reciprocation excursion of such piston pair in one direction from their midpoint back to the midpoint, and exhaust valve means for discharging each cylinder controlled by the piston pair operating in the other pair of cylinders during its reciprocation excursion in the opposite direction from its midpoint back to its midpoint and pump means actuated by each piston for drawing concentrate fluid from an inlet and discharging it into the output from the cylinder of that piston.

8. The combination claimed in claim 7 in which said pump means includes a pump cylinder cavity in the body of the motor piston, and a pump piston supported on the head of the motor cylinder coaxial with said pump cylinder cavity, and outlet means from the pump cylinder cavity through the body of the motor piston into the motor cylinder including a pump discharge check valve.

9. The combination in claim 8 in which said pump piston has an inlet passageway means therethrough to said pump cylinder cavity including an inlet check valve means, and an outlet means from the pump cylinder cavity through the body of the motor to the motor cylinder including a pump discharge check valve.

10. In a fluid proportioning device a housing including two head blocks at opposite ends thereof having outwardly opening recesses offset inwardly to provide a shoulder with the inner portion of the recesses connected to the other side of each block to serve as inlet and outlet passages for the housing respectively, the recess of the inlet block having a guide pin therein, a check valve member slidably mounted on said pin, a threaded female coupling member having a radial flange swivelly engaging said shoulder and a valve seat engaged by the check valve, sealing means between said coupling member and the inlet block, and retainer means retaining said coupling member in swivel engagement with said shoulder.

11. A fluid proportioning device comprising a housing having two motor cylinders therein, a motor piston reciprocably mounted in each cylinder, means interconnecting said pistons for coordinating their movement wherein one piston is halfway through its stroke when the other piston is at the end of its stroke, an inlet valve means of diluent fluid under pressure for each cylinder controlled by the piston moving in the other cylinder during its reciprocation excursion in one direction from its midpoint back to midpoint, and exhaust valve means for exhausting each cylinder controlled by said piston in the other cylinder during its reciprocation excursion from said midpoint back to midpoint in the opposite direction; and pump means actuated by each piston for drawing concentrate fluid from a concentrate inlet and discharging the concentrate fluid into the diluent discharged from the cylinder of that piston said housing having an inlet conduit interconnecting said inlet and a source of concentrate fluid under atmospheric pressure, and said pump means includes a pump cylinder having an intake valve opening into said conduit to admit fluid to the cylinder under negative gauge pressure, a pump piston in said cylinder, one of said motor pistons reciprocating said pump piston and cylinder with respect to each other to subject the fluid in said pump cylinder to a gauge pressure, said conduit having an opening through its wall to atmosphere, valve means closing said opening and held in position closing said opening when the pressure inside the conduit is less than the pressure outside of the conduit.

12. In a liquid flow control device a combination of conduit means having a valve port therein, a valve for closing said valve port having a valve stem including axially extending circumferentially spaced fingers flexing radially with internal enlargements thereon providing shoulders, a valve actuating means teminally received reciprocably within said fingers and having an enlarged portion engaging said shoulders for actuating said valve, and sleeve means releasably holding said enlargements in working engagement with said enlarged portion comprising a helically wound spring member telescoped over said fingers at said enlarged portion.

13. A fluid proportioning housing of plastic material comprising a pair of head blocks, a pair of valve blocks and a pair of cylinder blocks aranged wherein members of each pair are inverted to face each other with the cylinder blocks at the center, the valve blocks outside of the cylinder blocks and the head blocks outside of the valve blocks, sealing means between the blocks, a vise member disposed against the outer face of one of the head blocks, metal plates against the outer face of the other head block and against the outer face of the vise member, longitudinally disposed strap members terminally secured to the metal plates, and clamp means between the vise member and the adjacent metal plate for separating them and imposing a clamping pressure upon the blocks and said sealing means to provide a unitized housing of the blocks.

14. A fluid flow proportioning device comprising a motor responsive to diluent liquid flow under a constant flow rate over a wide range of pressures comprising, a crank means, four flow responsive reciprocating piston means interconnected by the crank means to successively start their flow responsive movement when a preceding piston has moved half the distance of its flow responsive stroke whereby two pistons are in overlapping flow response movements at any given time between direction reversal of the piston movement, said piston means being collectively free to accelerate the rotational characteristic of the crank as each piston means approaches its midpoint of movement, pump piston means actuated by the motor piston means in the same acceleration relationship with respect to each other as defined with respect to the motor piston means, passage means including inlet and outlet valves for each motor piston means for applying and exhausting liquid under pressure for said motor piston means, and conduit means including intake and discharge valves for each pump piston means for supplying concentrate liquid to said pump piston means and discharging it into said passage means on the output side of said motor piston means for mixture with diluent at a substantially constant rate of flow, and dispensing means connected to the outlet of said passage means for dispensing said mixture under pressure.

15. The combination called for in claim 14 in which said motor piston means have cylinders in their piston heads coacting with the pistons of said pump piston means, whereby said exhausting of diluent liquid and the discharge of concentrate liquid occur simultaneously for each associated motor and pump piston means.

16. A fluid proportioning device comprising a housing having four motor cylinders therein opposing each other in two axially aligned pairs, a motor piston in each cylinder with the pistons interconnected in pairs that are disposed in the pairs of axially aligned cylinders, yoke means journalled in said housing and having two crank arms disposed at 90° with respect to each other, interconnecting the pairs of interconnected pistons for coordinating their movement wherein the trailing piston pair is halfway through its stroke when the leading piston pair has reached the end of its stroke, an inlet valve means for diluent fluid under pressure for each cylinder actuating means carried by the piston pair operating in the other pair of cylinders for opening each inlet valve means during a reciprocation excursion of said other piston pair in one direction from their midpoint position back to their midpoint position ,exhaust valve means for discharging fluid under pressure from each cylinder actuating means for each exhaust valve means carried by the piston pair operating in the other pair of cylinders for opening exhaust valve means during reciprocation of excursion of the last mentioned piston pair in the opposite direction and then midpoint position back to their midpoint position, pump means actuated by each piston for drawing concentrate fluid from an inlet and discharging it into the motor cylinder of that piston comprising a pump cylinder cavity in the body of each motor piston, a pump cylinder sleeve insert in said pump cylinder cavity internally defining a pump cylinder and externally an exhaust passage between it and the wall of said cavity opening into the motor cylinder, a hollow pump piston extending from the head of the motor cylinder coaxially with and into cooperation with said cylinder sleeve insert, a pump discharge valve in said cavity closing against the inner end of said sleeve insert, an intake check valve means carried on the head end of said pump piston, said head end of said pump piston engaging and opening said discharge valve momentarily at the end of the compression stroke of said pump piston.

17. In a fluid proportioning device a housing including head blocks at opposite ends thereof having outwardly opening recesses offset inwardly to provide a shoulder with the inner portion of the recesses connected to the other side of each block to serve as inlet and outlet passages for the housing respectively, the recess of the inlet block having a stud guide therein, a check valve member slidably mounted on said stud, a threaded female coupling member having a radial flange swivelly engaging said shoulder and a valve seat engaged by the check valve, said coupling member having vent openings through the wall thereof located externally of said valve seat, resilient sealing sleeve means within said coupling member closing against said openings to provide a vacuum breaker valve when the pressure in the coupling falls below atmospheric pressure, sealing means between said coupling member and the inlet block, and retainer means retaining said coupling member in swivel engagement with said shoulder.

18. The combination called for in claim 5 in which said pump means comprises the combination of a piston element and cylinder element, said piston element having an elastomer seal slidably engaging the wall of the cylinder element under radial pressure in reciprocable relationship, and said wall of the cylinder element engaging the seal being made of a plastic impregnated with a lubricant of the group consisting of molybdenum polysulfide, carbon in graphite form and mixtures thereof.

19. In a pump construction called for in claim 18, a lubricant for said sliding engagement between said piston element and cylinder wall comprising a solution containing less than about 1% of polyethylene oxide.

20. A fluid proportioning device comprising a housing having two motor cylinders therein, a motor piston reciprocally mounted in each cylinder, means interconnecting said piston for coordinating their movement wherein one piston is halfway through its stroke when the other piston is at the end of its stroke, an inlet valve means for diluent fluid under pressure for each cylinder controlled by the piston moving in the other cylinder during its reciprocation excursion in one direction from its midpoint back to midpoint, and exhaust valve means for exhausting each cylinder controlled by said piston in the other cylinder during its reciprocation excursion from said midpoint back to midpoint in the opposite direction; and pump means actuated by each piston for drawing concentrate fluid from a concentrate inlet and discharging the concentrate fluid into the diluent discharged from the cylinder of that piston, said diluent fluid reciprocating each piston with a lineal velocity that is the greatest at approximately its midstroke accompanied by an absolute magnitude of acceleration that is substantially as great as that present at the begining and end of its stroke and with an absolute magnitude of acceleration between said midstroke and said beginning and end positions of the work stroke reaching approximately 35% of the maximum absolute magnitude of acceleration at said beginning and end.

21. The combination called for in claim 20 in which said maximum accelerations coincide when one piston is at its mid stroke position and the other piston is at the end of its stroke.

22. In the device defined in claim 5 said housing having an inlet opening connected to said inlet valve means for receiving municipal water from a dwelling faucet, and flexible conduit means interconnecting said inlet opening and said faucet with the housing in depending relationship.

References Cited

UNITED STATES PATENTS

| | | | |
|---|---|---|---|
| 2,491,604 | 12/1949 | Carlton | 137—218 |
| 2,808,786 | 11/1957 | Johnston | 103—178 |
| 3,307,571 | 3/1967 | Smith | 137—218 |

WILLIAM F. O'DEA, Primary Examiner

H. M. COHN, Assistant Examiner

U.S. Cl. X.R.

103—78; 137—218, 543.15; 287—119